(12) United States Patent
Mankau

(10) Patent No.: US 11,000,958 B2
(45) Date of Patent: May 11, 2021

(54) DEFLECTION ELEMENT

(71) Applicant: Festo AG & Co. KG, Esslingen (DE)

(72) Inventor: Dieter Mankau, Frankfurt am Main (DE)

(73) Assignee: Festo AG & Co. KG, Esslingen (DE)

( * ) Notice: Subject to any disclaimer, the term of this patent is extended or adjusted under 35 U.S.C. 154(b) by 294 days.

(21) Appl. No.: 16/074,776

(22) PCT Filed: Jan. 27, 2017

(86) PCT No.: PCT/EP2017/051737
§ 371 (c)(1),
(2) Date: Aug. 2, 2018

(87) PCT Pub. No.: WO2017/133971
PCT Pub. Date: Aug. 10, 2017

(65) Prior Publication Data
US 2019/0077029 A1 Mar. 14, 2019

(30) Foreign Application Priority Data
Feb. 2, 2016 (DE) .................... 10 2016 101 812.0

(51) Int. Cl.
*B25J 18/04* (2006.01)
*B25J 17/02* (2006.01)
(Continued)

(52) U.S. Cl.
CPC ............. *B25J 17/0275* (2013.01); *B25J 9/14* (2013.01); *B25J 9/142* (2013.01); *B25J 17/00* (2013.01);
(Continued)

(58) Field of Classification Search
CPC ........ B25J 17/0275; B25J 9/14; B25J 9/0015; B25J 9/142; B25J 19/0083; B25J 18/025; B25J 9/08; B25J 18/04
See application file for complete search history.

(56) References Cited

U.S. PATENT DOCUMENTS 4,784,042 A * 11/1988 Paynter .................... B25J 9/142
414/7
4,904,514 A * 2/1990 Morrison ............. B25J 19/0083
428/53
(Continued)

FOREIGN PATENT DOCUMENTS

DE 2916312 10/1980
JP 60-161593 10/1985
(Continued)

OTHER PUBLICATIONS

Internationaler Recherchenbericht und Schriftlicher Bescheid [International Search Report and the Written Opinion] dated May 4, 2017 From the International Searching Authority Re. Application No. PCT/EP2017/051737 and Its Translation of Search Report Into English. (17 Pages).

*Primary Examiner* — William Kelleher
*Assistant Examiner* — Gregory T Prather

(57) ABSTRACT

A deflection element (10) for robot arms has two arm braces that are pivotally mounted on a joint mechanism. In order to create a universally useable deflection element, the two arm braces (12) are each mounted on a support structure (20) of the joint mechanism by means of an arm joint (18), and the two arms braces (12) are coupled to a connecting element (22) between the two arm joints (18), said connecting element (22) being movable relative to the support structure (20); furthermore, at least one actuating element (50; 51), which moves the connecting element (22) and thus pivots the arm braces (12) between the end positions thereof, is (Continued)

arranged between the support structure (20) and the connecting element (22).

11 Claims, 7 Drawing Sheets

(51) Int. Cl.
  *B25J 18/00*  (2006.01)
  *B25J 17/00*  (2006.01)
  *B25J 9/14*  (2006.01)
  *B25J 18/02*  (2006.01)
  *B25J 9/00*  (2006.01)
  *B25J 9/08*  (2006.01)

(52) U.S. Cl.
  CPC ............ *B25J 18/00* (2013.01); *B25J 18/025* (2013.01); *B25J 18/04* (2013.01); *B25J 9/0015* (2013.01); *B25J 9/08* (2013.01)

(56) References Cited

U.S. PATENT DOCUMENTS

| | | | | |
|---|---|---|---|---|
| 5,692,412 | A | * | 12/1997 | Rosheim .................... B25J 9/06 74/490.01 |
| 2007/0144299 | A1 | * | 6/2007 | Okazaki ................ B25J 9/1075 74/490.1 |
| 2015/0285238 | A1 | * | 10/2015 | Lynn .................... A61H 1/0277 417/53 |
| 2017/0074316 | A1 | * | 3/2017 | Kim ....................... A61F 5/0125 |
| 2019/0363498 | A1 | * | 11/2019 | Cox .................. H01R 13/2478 |

FOREIGN PATENT DOCUMENTS

| | | |
|---|---|---|
| JP | 2000-237985 | 9/2000 |
| JP | 2006-341336 | 12/2006 |
| JP | 2008-260089 | 10/2008 |
| WO | WO 2017/133971 | 8/2017 |

* cited by examiner

DEFLECTION ELEMENT

RELATED APPLICATIONS

This application is a National Phase of PCT Patent Application No. PCT/EP2017/051737 having International filing date of Jan. 27, 2017, which claims the benefit of priority of German Patent Application No. 10 2016 101 812.0 filed on Feb. 2, 2016. The contents of the above applications are all incorporated by reference as if fully set forth herein in their entirety.

FIELD AND BACKGROUND OF THE INVENTION

The invention according to the preamble of claim 1 relates to a deflection element, especially for robot arms, having two arm braces, which are pivotally mounted on a joint mechanism.

For an optimal mobility, it is often in the case of robot arms required to design said robot arms with joints forming bending sites, while drive units in combination with suitable measuring and regulating equipment ensure that a particular bending angle can be traveled exactly. Robot arms can be used for highly diversified applications, handling very different loads and sometimes needing to be controlled very precisely, e.g., in order to be able to be used in the in the manufacturing process during the production of high-quality products. Different kinds of drive units for the deflection elements are customary, such as electric drive units, which can be arranged in the deflection element itself or act on the joint by traction means. Pneumatic or hydraulic actuating elements are also known, acting between the arm braces. Basically, it is always desirable to provide light, yet still very sturdy deflection elements.

SUMMARY OF THE INVENTION

The problem which the present invention proposes to solve is to create a deflection element which has universal application with slight footprint requirement.

According to the invention, the problem is solved by a deflection element of the kind mentioned above, in which the two arm braces are each mounted on a support structure of the joint mechanism by means of an arm joint and the two arm braces are coupled to a connecting element between the two arm joints, said connecting element being movable relative to the support structure, wherein at least one actuating element, which moves the connecting element and thus pivots the arm braces between their end positions, is arranged between the support structure and the connecting element.

The major difference between the invention and known solutions is that the two arm braces are joined together not by only one joint with a joint axis, but rather a specific joint is provided on the support structure for each arm brace. This provides greater freedom in terms of design in the region of the connecting element between the two joints, which freedom can be used for adapting to different kinds of drive unit (electric, pneumatic or hydraulic), including the power supply and control lines and the respective application, for example, in order to optimize the deflection element in the direction of a large load bearing capacity or a high precision.

In one preferred embodiment of the invention, it is provided that the connecting element comprises at least one flexible element, which joins together the two arm braces.

The flexible element ensures that the two arm braces are held independently from the angular position in a defined position relative to each other which is advantageous for example with regard to an exact determination of the position of the deflection element by suitable sensors.

Preferably the flexible element is fashioned as a bending elastic spring element. In this embodiment, it is possible for example to design the spring element for resetting to a neutral position, so that in a state free of driving forces the extended middle position is always set by virtue of the restoring forces of the spring element. One may also speak of a spring joint in this case, which sits as a third joint between the two outer arm joints and synchronizes the movement of the two arm braces relative to each other as part of the connecting element.

Yet the flexible element may also be designed as a simple bending joint, instead of as a bending elastic element.

Another preferred embodiment of the invention provides that the arm braces are each linked by a joint connection to the connecting element.

This embodiment makes possible a connecting element with a large cross section, which is especially well suited for the direct coupling of actuating elements within the joint element. It has been found that this design measure can also realize a larger maximum swivel angle between the two arm braces.

An especially preferred embodiment of the invention provides that the connecting element is movably guided in a guide on the support structure.

Thanks to the guide of the connecting element, the precision of the deflecting unit when moving into the different angular positions can be significantly improved. It is especially expedient here, for most applications, to design the guide of the connecting element as a linear guide, which is arranged in the plane of symmetry between the two arm braces.

Thanks to this arrangement, the connecting element always moves during the swiveling in the plane of symmetry between the two arm braces, so that the mechanical load is also always evenly distributed. Yet asymmetrical designs may also be used deliberately, for example, in order to provide a transmission ratio between the two arm braces, if that is desirable.

Regardless of the geometrical arrangement of the guide of the connecting element, this may comprise a roller or plain bearing.

In another especially preferred embodiment of the invention it is provided that a length adjustment is provided between the two arm joints for the ends of the arm braces moving relative to each other upon swiveling.

The length adjustment is usually advantageous in order to compensate for the distance changes that occur due to the swiveling and yet still make possible a definite guide of the two arm braces relative to each other. Alternatively, the two ends of the arm braces could also interlock, e.g., by means of a meshing, whose radius is defined each time by the distance from the respective arm joint.

The length adjustment may be provided at different positions within the deflection element. A first solution provides that the ends of the two arm braces or the connections between the arm braces and the connecting element are designed telescopically as the length adjustment. The telescopic device here is formed between the arm joints and the connecting element, the telescopically engaging arm portions being able to be guided against each other by roller or plain bearings.

In another embodiment of a length adjustment it is provided that, to form a length adjustment, the joint connections between the arm braces and the connecting element are formed by joint heads guided in longitudinal grooves in the connecting element.

It has been found that, with this kind of length adjustment in combination with the attachment of each arm brace to the connecting element by its own joint connection, the maximum possible swivel angle between the two arm braces can be further increased. The two longitudinal grooves herein run substantially flush with each other.

In this embodiment, the connecting element may readily have rigid, large-area attachment surfaces with which pneumatic actuating elements in the form of a bellows, e.g., directly engage on a large area. While this layout also works with flexible and/or spring-loaded resilient connecting elements, the rigid bearing surface protects the wall of such actuating elements and is also easier to detect by measurement techniques, thanks to the more uniform filling over the adjustment travel, than a connecting element which bends or buckles in the middle.

It is not absolutely necessary here for the arm braces to engage by separate joints with the connecting element, they can also embrace the connecting element in the manner of a fork, the connecting element then being much flatter in configuration, preferably in the form of a circular disk, and they can then be linked in turn to the connecting element by a common joint connection. The length adjustment then also occurs as described above, by a telescopic length adjustment.

Basically, the deflection element according to the invention can be combined with any type of drive unit, it being advantageous to have space available between the two arm joints in order to arrange the actual drive elements and any required gearing elements or length adjustment elements.

In a first embodiment, an electric drive unit is provided for adjusting the angular position of the deflection element on the support structure, preferably an electric motor by means of a self-locking threaded spindle, which engages with a thread connected to the connecting element and thereby moving the connecting element relative to the support structure. The self-locking drive unit has the advantage that the angular position also does not change under a weight load when the drive unit current is switched off, which may be desirable in certain applications, e.g., when the robot arm is carrying loads which should be held securely even in event of a loss of the driving power.

Alternatively, the actuating element is formed by two opposing pneumatic or hydraulic actuators. These actuators in turn may be arranged directly between the support structure and the connecting element, so that the connecting element lies between the two actuating elements. Besides commercially available actuating elements with pistons moving in cylinders, actuating elements subjected to pressurized gas or fluid as volume-variable tires are especially suited for the deflection element according to the invention. The cases of these actuating elements may have the form of a textile fabric or of blow-molded PU parts such as a bellows, to name a few examples.

Preferably the adjusting movement occurs in a direction parallel to the plane of symmetry between the two arm braces, so that uniform force is applied to the mechanical parts.

For use in robot arms which need to head for exact positions, the use of sensors in the deflection element is of advantage. In particular, it is advantageous for the universal applicability in different applications to detect the movement of the deflection element itself and to then evaluate the detected data jointly with the position data of other movement elements, which are likewise employed in the particular robot arm. Alternatively, the position in space e.g. of a grip arranged at the end of the robot arm can also be detected, wherein then the motion control occurs also naturally via the deflection element.

The preferred detecting of the angular position directly in the deflection element occurs preferably by means of sensors, which detect the relative position of the respective arm brace relative to the support structure between the two arm braces at least in the region of one arm brace and/or which detect in the region of the guiding of the connecting element the relative position of the connecting element to the support structure. In either case, the detected relative position makes directly possible an immediate calculation of the angular position, since the arm braces and the connecting element in a particular angular position are always also in a defined position to the support structure. Several sensors may then be used, in particular, if a redundant detection of measurement should be required for safety considerations.

Depending on the application, it may be advantageous to form end stop surfaces between the arm braces and the support structure, limiting the maximum swivel angle. This prevents an overstraining of the mechanism in the region of the connecting element.

Finally, also especially preferred is an embodiment of the invention in which the support structure between the two arm joints is designed as a closed housing or is surrounded by a closed housing. Since the two spherical bearings for the arm braces can be designed stationary to each other anyway, the layout of the deflection element according to the invention easily allows the arrangement of a housing which protects all sensitive drive, guidance, control and sensor elements against environmental factors, without variable-length covers needing to be used for protection of the sensitive parts, such as bellows or the like, which themselves have a high tendency to wear down.

BRIEF DESCRIPTION OF THE SEVERAL VIEWS OF THE DRAWINGS

Further features, details and advantages of the invention emerge from the wording of the claims, as well as from the following description of exemplary embodiments with the aid of the drawings. There are shown the following figures:

DESCRIPTION OF SPECIFIC EMBODIMENTS OF THE INVENTION

Figure 1:
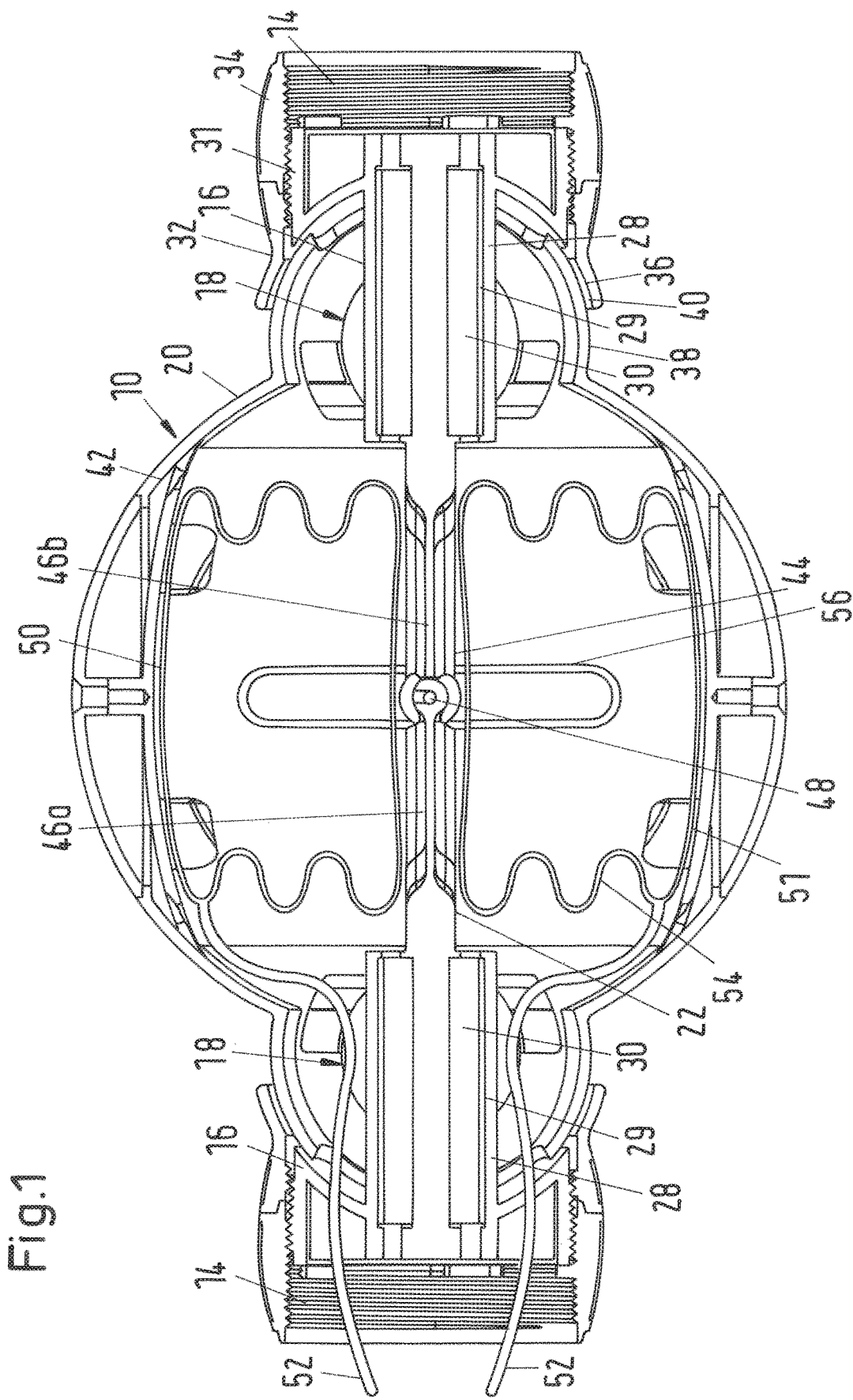
FIG. 1—a longitudinal section of a first embodiment of a deflection element in an extended position.

FIG. 1 shows a deflection element 10 intended for use in robot arms. The deflection element 10 lies between two arm braces 12 (see FIG. 7), not themselves shown in FIG. 1. The arm braces themselves consist of simple tubes of a suitable material for the particular application. The tubes may be screwed by suitable fastening means (not shown) into internal threads 14.

The two internal threads 14 are associated with half joints 16 of arm joints 18 at the arm end, by means of which the arm braces 12 are pivotally mounted on a support structure 20. This support structure 20 constitutes the frame of the deflection element 10, on which the two arm joints 18 are mounted and a connecting element 22 connecting the two arm braces 12 between the two arm joints 18 is movably guided.

Figure 2:
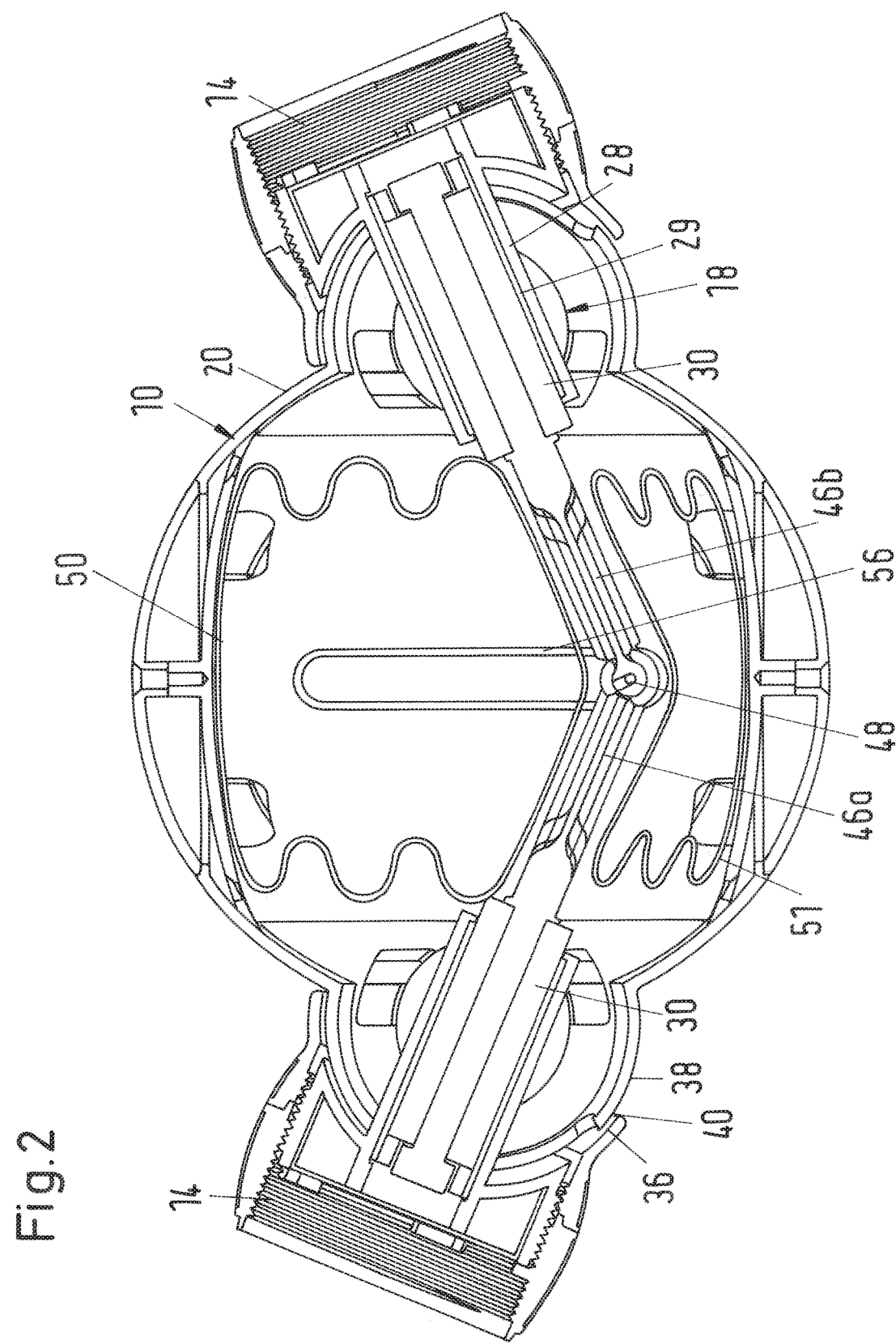
FIG. 2—a longitudinal section of the deflection element of FIG. 1 in a maximum deflected position.
Figure 3:
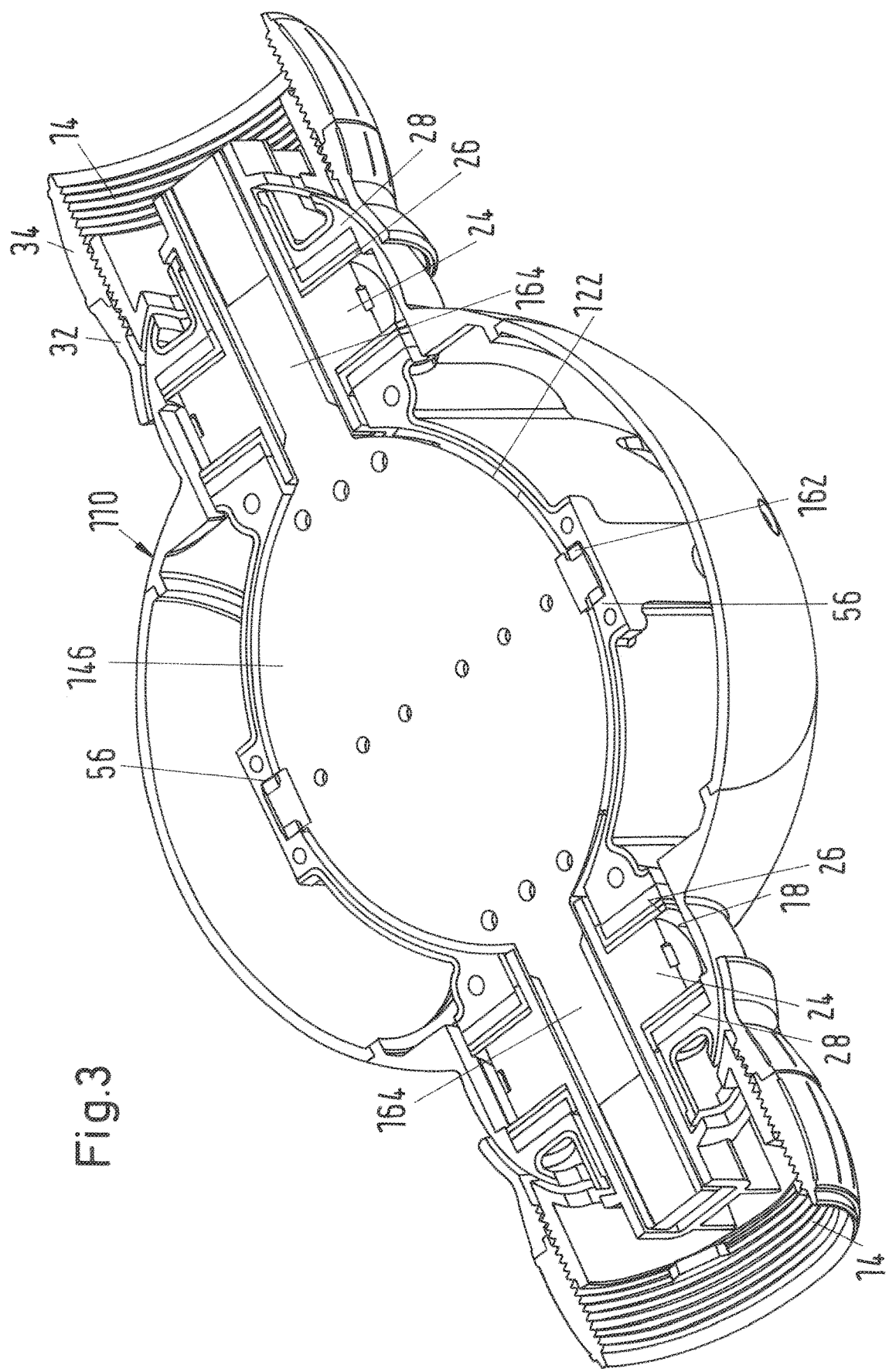
FIG. 3—a longitudinal section of a second embodiment of a deflection element in an extended position.
Figure 4:
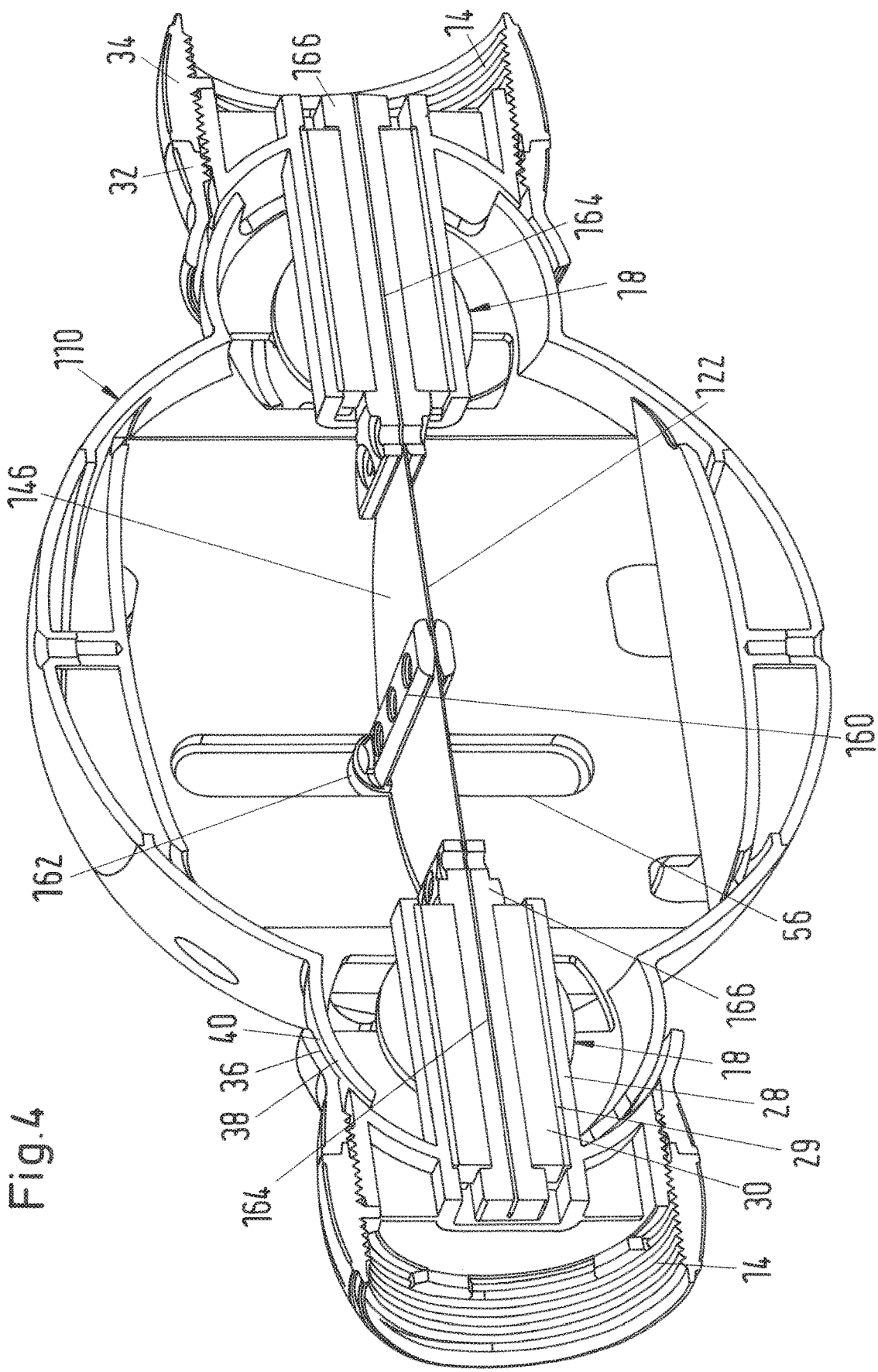
FIG. 4—a longitudinal section of the deflection element of FIG. 3, rotated by 90°.

The arm joints 18 are each designed accordingly in the two exemplary embodiments shown in FIGS. 1 and 2 as well as FIGS. 3 and 4, so that reference is made to FIG. 3 in this place for the explanation of the more detailed construction. Accordingly, the arm joints 18 each have a joint pin 24, which is pivotally mounted in a bearing shell 26 on the support structure 20. The joint pins are connected to a movable joint structure 28, on which the connecting element 22 is attached across a telescopic length adjustment 29. The telescopic length adjustment 29 has a low-friction linear roller bearing 30.

The joint structures 28 are furthermore each provided with an external thread 31, on which two threaded sleeves 32, 34 are respectively screwed, being clamped against one another in the fashion of a locking nut. The rear threaded sleeve 32 has a hemispherical inner contour 36, which interacts in a sealing manner with a spherical outer contour 38 of the support structure 14. Sealing elements 40 on the inner contours 36 can further improve the sealing action in the interacting with the spherical outer surface.

The support structure 20 is fashioned as a closed housing 42 between the two arm joints 18, so that, in concert with the sealing elements 40 or a labyrinth seal fashioned there, the interior of the housing 42 is securely protected against environmental factors. The housing 42 may be produced by way of additive manufacturing processes in the structure shown in the figures and is preferably divided in the sectional plane shown in FIG. 4 in order to be able to install all individual pieces of the deflection element 10.

The connecting element 22 in the embodiment of the deflection element 10 shown in FIGS. 1 and 2 consists of a symmetrically constructed element 44, whose two half-disk-shaped halves 46 a, b are joined together in the middle by a joint connection 48. The ends 49 a, b of these two half joints 46 a, b form part of the telescopic length adjustment 29.

In the exemplary embodiments shown in FIGS. 1 to 4, each time two pneumatic actuating elements 50, 51 are provided, which can be subjected to pressure each time via connection lines 52 and which can perform adjustment movements in opposite directions. The connection lines are guided through cavities in the deflection element 10 and the hollow arm braces from an attachment point of the robot arm to the actuating elements. The actuating elements 50 themselves are designed in the fashion of bellows and possess, in the exemplary embodiment shown, blow-molded PU walls 54, which may be strengthened with a fabric, which at the same time also influences the degree of freedom of deformation when pressure is applied.

The connecting element 22 is provided with a roller guide on the joint axis of the joint connection 48, which is guided in a linear guide slot 56 in the support structure. The ends of the guide slot 56 in this embodiment also bound the maximum swivel angle, represented in one direction in FIG. 2, when pressure is applied to the upper actuating element 50.

By applying pressure to the lower actuating element 51, the limit angle mirrored about the center plane is reached in the opposite direction of deflection.

A position detection of the angular position of the deflection element 10 is made possible by sensors (not shown), which detect the angular position of at least one arm joint 18 and/or the position of the joint axis of the joint connection 48 in the guide slot 56. By means of the determined position, the activation of the actuating elements can be controlled, while the electrical feed lines (not shown) of the sensors likewise run through the cavities in the deflection element 10 and the arm braces.

The embodiment of a deflection element 110 shown in FIGS. 3 and 4 differs from the variant shown in FIGS. 1 and 2 by the different design of the connecting element 122. The connecting element 122 has a one-piece, plate-shaped spring element 146, which is elastically deflectable from a middle position in a bending elastic manner. At the center there is attached a holder 160 for a roller guide 162 on the spring element 146, the rollers 162 being guided in the two lateral guide slots 56, corresponding to the previously described embodiment.

The spring element 146 has protrusions 164 on both sides, which are clamped in holding elements 166, which in turn form the telescopic region of the length adjustment 29 in the arm joints. The actuating elements 50, 51 have been half omitted in FIGS. 3 and 4 for better visibility, but they correspond to the actuating elements explained in connection with FIGS. 1 and 2. The spring element 146 acts like an elastic spring joint, joining together the two arm braces.

Figure 5:
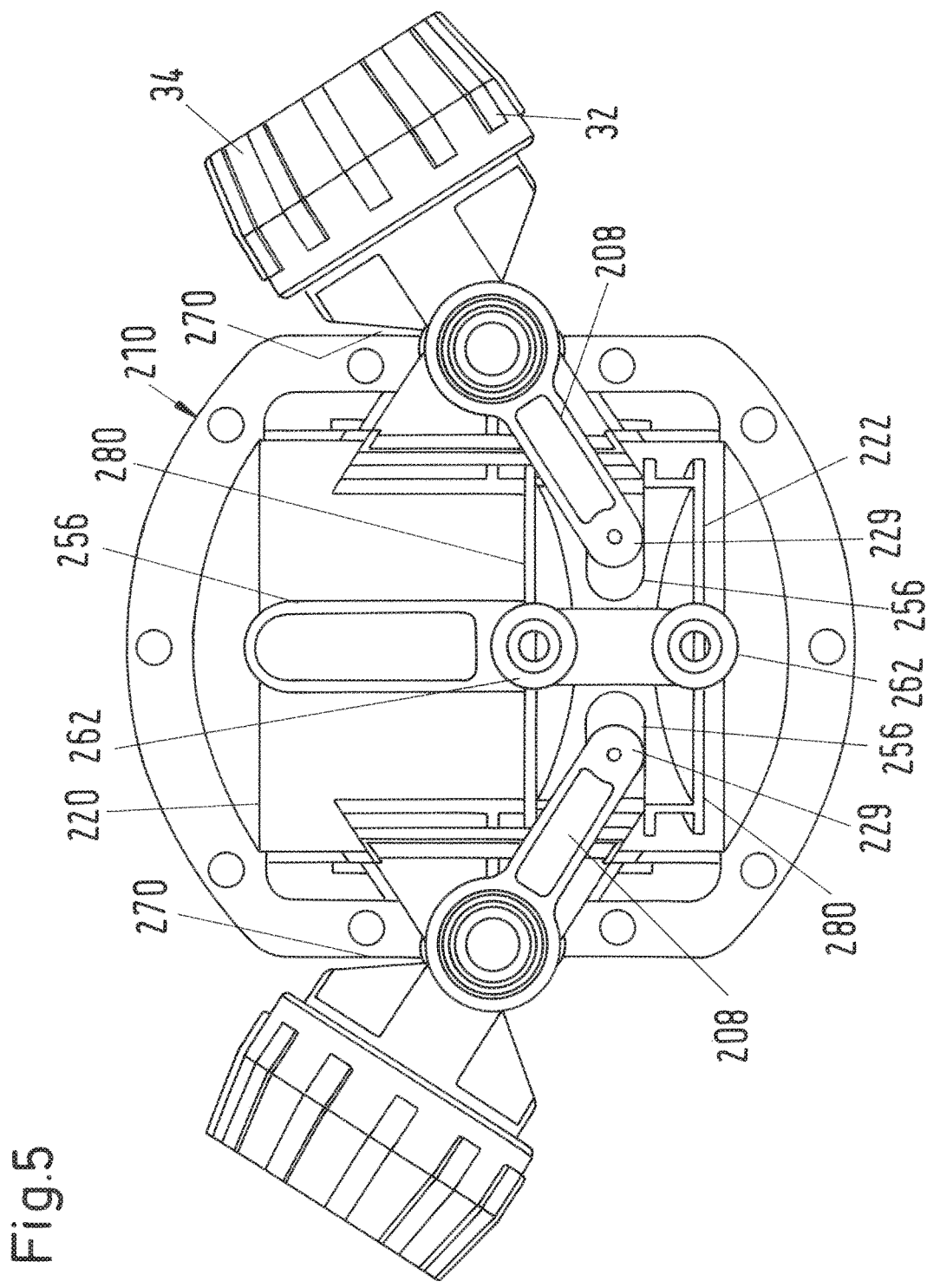
FIG. 5—a longitudinal section of a third embodiment of a deflection element.

FIG. 5 shows another embodiment of a deflection element 210, which has a somewhat more deviant configuration, especially in the region of a connecting element 222, which is guided here similar to a piston in a guide in the support structure 220. For this, two pairs of rollers are mounted on the connecting element 222 as roller guides 262, which are guided in guide slots 256.

The arm braces 12, once again not shown, are in turn mounted by two arm joints 218 on the support structure 220, while the arm braces 12 here are respectively continued across an arm structure 208 into the interior of the housing. A length adjustment in the direction of extension of the arm braces is not provided in this embodiment, instead sliding elements 229, or alternatively roller elements, are provided at the ends of the arm structures 208, being guided in longitudinal grooves 257 and thus ensuring the relative mobility of the arm structures 208 relative to the connecting element 222.

The limit position shown in FIG. 5 is defined by end stops 270 between the arm structures 208 and the outside of the housing. It has been found that, with the design layout of the deflection element 210 according to FIG. 5, larger deflection angles can be realized than with the previously described embodiments. Another advantage of the variant of a deflection element 210 according to FIG. 5 is that the connecting element 222 has flat attachment surfaces 280 for the pneumatic actuating elements, which may correspond substantially to the previously described actuating elements 50, 51. Since the attachment surfaces 280 do not become deformed upon swiveling, unlike the two previously described embodiments, the actuating element is accordingly not deformed even at its end face, which lessens its strain and possibly extends its lifetime. It has also been found that, with such a rigid and flat bearing surface, the changes in movement of the deflection element 210 can be better detected by measuring techniques than with bending or elastically deforming connecting elements 22, 122 in concert with bellows-like actuating elements 50, 51 having a wall which is also elastic at the end face.

Figure 6:
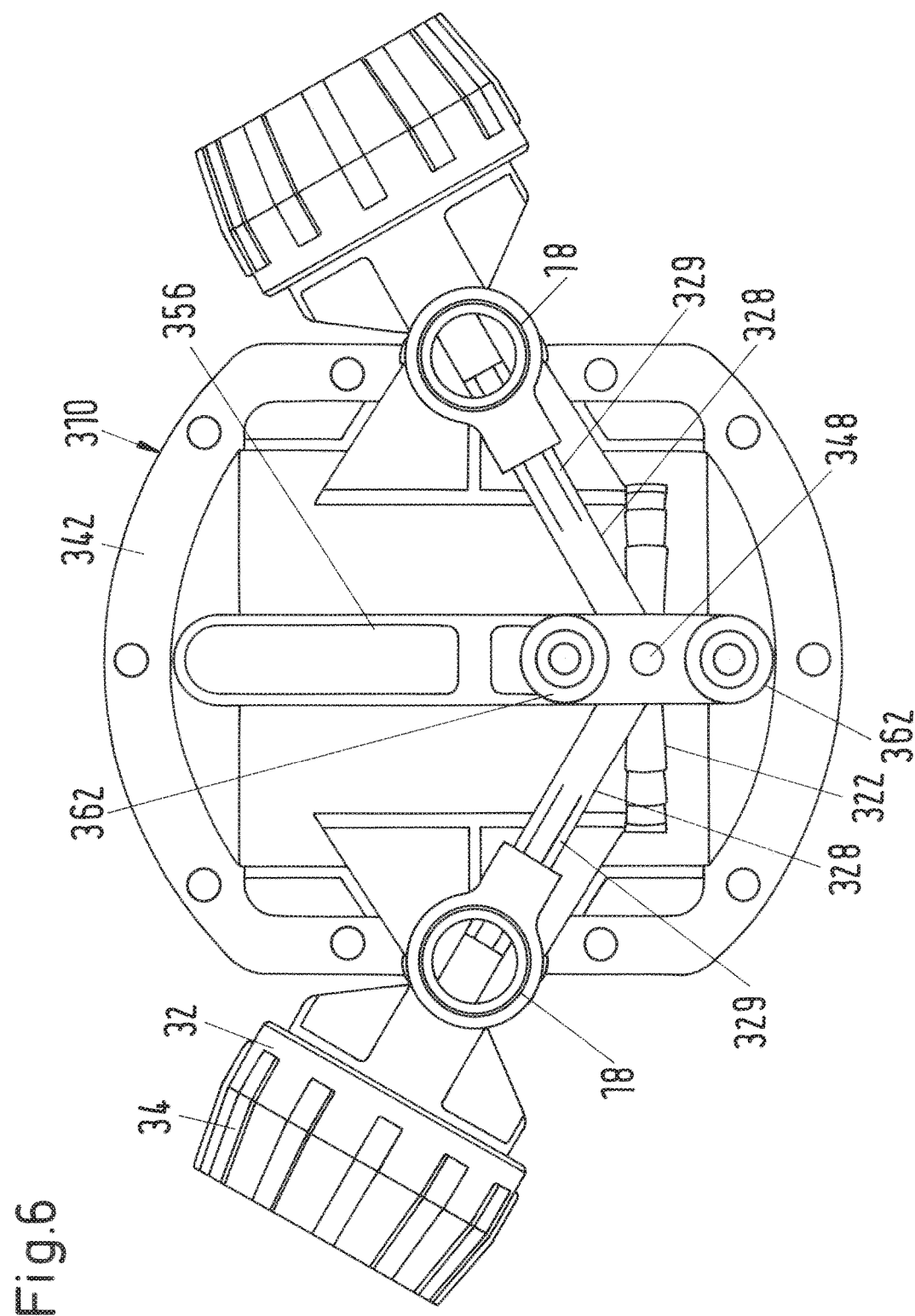
FIG. 6—a longitudinal section of another embodiment of a deflection element.

FIG. 6 shows another embodiment of a deflection element 310, in which the connecting element is likewise smooth and has attachment or pressing surfaces for the actuating elements 50, 51 (not shown) which are not deformed during the deflection. Even though here the two arm braces are once again linked by a joint structure 328 to a common joint point 348 on the connecting element 322, this is made possible in that the two joint structures embrace the connecting element 322 like a fork and thus leave free the central region as a bearing for the actuating elements. The joint structures moreover have a length adjustment 329 similar to the embodiments of FIGS. 1 to 4, since longitudinal grooves as length adjustment running perpendicular to the direction of movement of the connecting element 322, as in the embodiment shown in FIG. 5, are not possible here on account of the flat construction of the connecting element 322. On the other hand, this flat construction has the advantage that more room is available for the actuating elements 50, 51 or the housing 342 of the deflection element 310 can have a smaller dimension for the same dimensioned actuating elements.

The roller guide of the connecting element 322 once again occurs by two pairs of rollers 362, which run in guide slots 356. The joint connection 348 for the attachment of the joint structures 328 rigidly connected to the arm braces 12 in the swivel direction occurs at the middle between the guide rollers 362 of the guide of the connecting element 322.

The pneumatic actuating elements shown and described can easily be replaced by electrical drive unit elements, which act on the connecting element for example across an electrical spindle drive. A spindle drive has the advantage that it can have a self-locking design with no problem, so that a correspondingly configured deflection element can hold a load acting on its arm braces even when the drive unit is deactivated.

Figure 7:
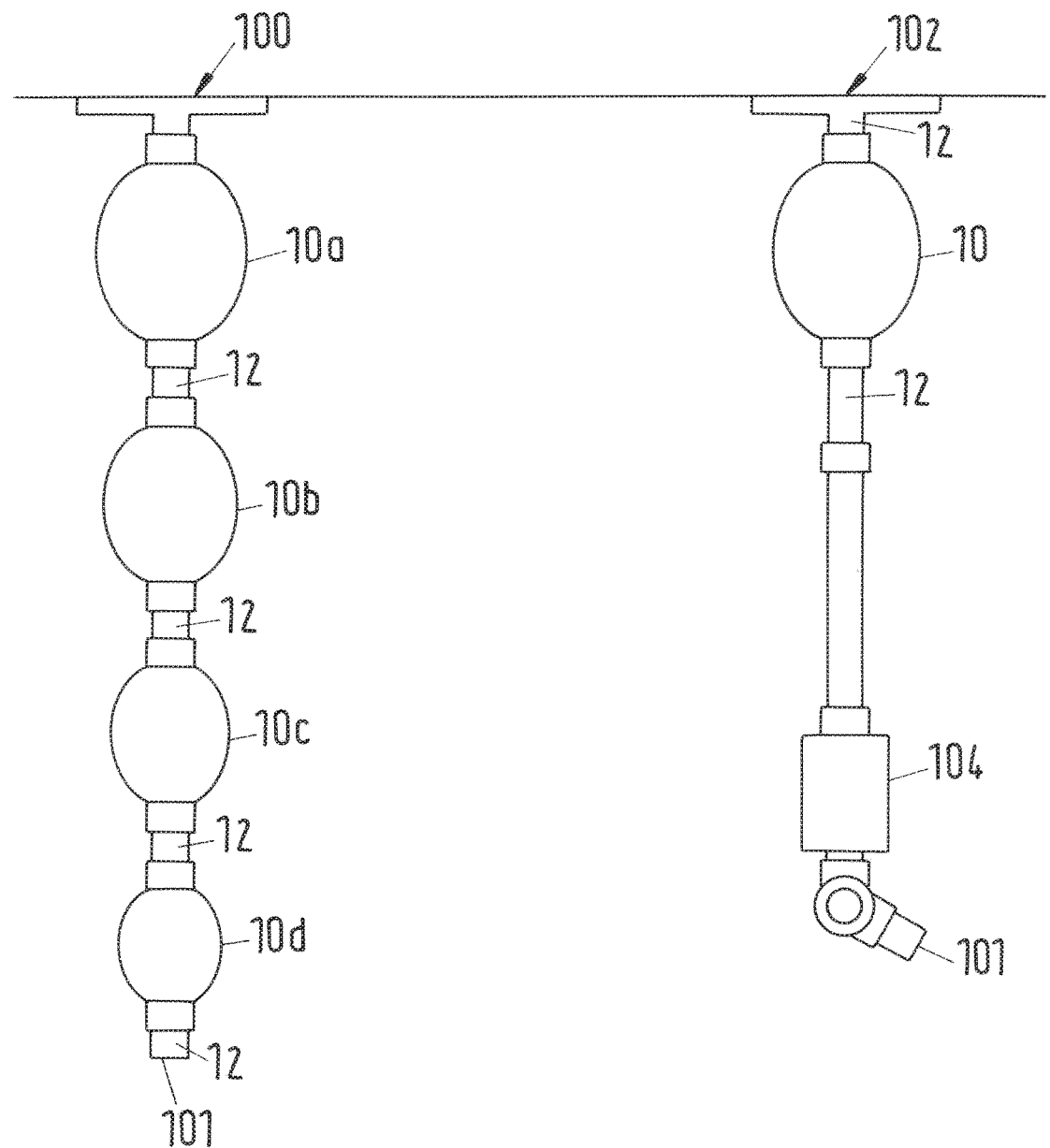
FIG. 7—a view of different combination possibilities of a deflection element in variously configured robot arms.

FIG. 7 shows as an example two robot arms 100 and 102, which are built with a previously described deflection element 10. The robot arm 100 depicted on the left side consists of four deflection elements 10 *a, b, c* and *d*, arranged in a row, while a grip not represented may be arranged at its end 101. Thanks to the combination of several deflection elements in a row, the swivel angle can be further increased, wherein a rotated arrangement may also be feasible in order to make possible a swiveling of the robot arm also in a correspondingly rotated plane. In keeping with the bending moment load diminishing toward the free arm end, the deflection elements 10 are smaller in dimension toward the arm end.

On the right side in FIG. 7 there is shown a robot arm 102, which combines a length-adjustable module 104 with a deflection element 10 according to the invention.

These two robot arms are to be understood only as examples. Of course, the deflection modules of the kind discussed here may be combined with any other modules in robot arms. Such modules may enable a movement in any desired degree of freedom, so that any desired mobility may be provided by design for a robot arm.

The invention is not limited to one of the previously described embodiments, but rather can be modified in various ways.

All of the features and advantages appearing from the claims, the description and the drawing, including design details, spatial arrangements and method steps, can be essential to the invention both in themselves and also in the most diverse of combinations.

LIST OF REFERENCE NUMBERS

10 Deflection element
12 Arm brace
14 Internal thread
16 Half joint
18 Arm joint
20 Support structure
22 Connecting element
24 Joint pin
26 Bearing shell
28 Joint structure
29 Length adjustment
30 Linear roller bearing
31 External thread
32, 34 Threaded sleeves
36 Spherical inner contour
38 Spherical outer contour
40 Sealing element
42 Housing
44 Symmetrical element
46*a, b* Disk-shaped halves
48 Joint connection
49*a, b* Ends of the disk-shaped halves
50, 51 Pneumatic actuating elements
52 Connection lines
54 Wall
56 Guide slot
100 Robot arm
101 Arm end
102 Robot arm
104 Length-adjustable module
110 Deflection element
122 Connecting element
146 Spring element
162 Roller guide
164 Protrusions
166 Holding elements
208 Arm structure
210 Deflection element
218 Arm joint
220 Support structure
222 Connecting element
229 Sliding elements
256 Guide slot
257 Longitudinal groove
262 Roller guide
270 End stop
280 Attachment/pressure surface
310 Deflection element
322 Connecting element
328 Joint structure
329 Telescopic length adjustment
342 Housing
348 Joint connection
356 Guide slot
362 Roller guide

What is claimed is:

1. A deflection element for robot arms (100, 102), having two arm braces (12), that are pivotally mounted on a joint mechanism, wherein the two arm braces (12) are each mounted on a support structure (20; 220) of the joint mechanism by means of an arm joint (18; 218) and the two arm braces (12) are coupled to a connecting element (22;

122; 222; 322) between the two arm joints (18; 218), said connecting element being movable relative to the support structure (20; 220), wherein the deflection element further comprises at least one actuating element (50; 51)7 which moves the connecting element (22; 122; 222; 322) and thus pivots the arm braces (12) between their end positions, is arranged between the support structure (20; 220) and the connecting element (22; 122; 222; 322);

wherein the connecting element (22; 122; 222; 322) is movably guided by a linear guide (56; 256; 356) arranged in the plane of symmetry between the two arm braces (12);

wherein the support structure is a rigid support structure carrying the two arm joints (18; 218), the linear guide (56; 256; 356) and the at least one actuating element (50, 51);

wherein the at least one actuating element (50, 51) is formed by opposing pneumatic or hydraulic actuators.

2. The deflection element as claimed in claim 1, wherein the connecting element (22; 122) comprises at least one flexible element (44; 146), which joins together the two arm braces (12).

3. The deflection element as claimed in claim 2, wherein the flexible element (44) has at least one joint (48), which is arranged at the intersection of prolongations of the two arm braces.

4. The deflection element as claimed in claim 1, wherein the arm braces are each linked by a joint connection to the connecting element (222).

5. The deflection element as claimed in claim 1, wherein the linear guide on the support structure (220).

6. The deflection element as claimed in claim 1, wherein a length adjustment (29; 257; 329) is provided between the two arm joints (18; 218) for the ends of the arm braces (12) moving relative to each other upon swiveling.

7. The deflection element as claimed in claim 6, wherein the ends of the arm braces or the connections between the arm braces (12) and the connecting element (22; 122; 322) are designed telescopically as the length adjustment.

8. The deflection element as claimed in claim 1, wherein the adjusting direction of the actuating elements lies parallel to a plane of symmetry between the two arm braces (12).

9. The deflection element as claimed in claim 1, wherein, for detecting the angular position between the two arm braces (12), sensors are provided in the region of at least one arm joint (18; 218) for detecting the relative position of the respective arm brace (12) relative to the support structure (20; 220) and/or in the region of the guiding of the connecting element (22; 122; 222; 322) for detecting the relative position of the connecting element (22; 122; 222; 322) to the support structure (20; 220).

10. The deflection element as claimed in claim 1, wherein end stop surfaces (270) are provided between the arm braces (12) and the support structure (220), limiting the maximum swivel angle.

11. The deflection element as claimed in claim 1, wherein the support structure (20; 220) between the arm joints (18; 218) is designed as a closed housing (42) or is surrounded by a closed housing.

* * * * *